US006614753B2

United States Patent
Ikawa

(10) Patent No.: US 6,614,753 B2
(45) Date of Patent: *Sep. 2, 2003

(54) TERMINAL APPARATUS, DEVICE FOR DETECTING THE MISMATCHING OF WORK/PROTECTION LINE BRIDGING FUNCTION IN A SYNCHRONOUS COMMUNICATION NETWORK AND THE METHOD

(75) Inventor: Fumihiro Ikawa, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,289

(22) Filed: Jun. 30, 1998

(65) Prior Publication Data

US 2003/0012134 A1 Jan. 16, 2003

(30) Foreign Application Priority Data

Feb. 5, 1998 (JP) .......................... 10-024750

(51) Int. Cl.[7] .............. H04L 1/00; H04J 3/16
(52) U.S. Cl. .......... 370/222; 370/228; 370/539
(58) Field of Search ................ 370/228, 222, 370/223, 224, 227, 225, 226, 242, 245, 252, 539, 907, 220, 221; 714/1, 2, 715, 716, 717; 340/825.01

(56) References Cited

U.S. PATENT DOCUMENTS

| 5,341,364 A | * | 8/1994 | Marra et al. ............... 370/223 |
| 5,636,205 A | * | 6/1997 | Suzuki et al. .............. 370/224 |
| 5,712,847 A | * | 1/1998 | Hata ........................... 370/228 |
| 5,793,745 A | * | 8/1998 | Manchester ................. 370/224 |
| 5,870,382 A | * | 2/1999 | Tounai et al. ............... 370/220 |
| 5,978,354 A | * | 11/1999 | Taketomi et al. ........... 370/226 |
| 6,141,320 A | * | 10/2000 | Ikawa ......................... 370/227 |

FOREIGN PATENT DOCUMENTS

JP 7264156 10/1995

OTHER PUBLICATIONS

"Multiplex section protection (MSP) protocol, commands and operation", ITU–T Draft Revised Recommendation G. 783 Jun. 2, 1996 pp. 117–130.
Sadakuni Shimada et al., "SDH Transmission System", OHMSHA Limited Sep. 20, 1993, (8) K1 and K2 p. 62 & 4.7 Protection swithc method of a transmission path (pp. 105–109).

* cited by examiner

Primary Examiner—Chau Nguyen
Assistant Examiner—Soon-Dong Hyun
(74) Attorney, Agent, or Firm—Katten Muchin Zavis Rosenman

(57) ABSTRACT

An optical receiver unit is connected to each of a work optical line and a protection optical line, and after an optical signal is converted to an electrical signal, only the overhead of the signal is extracted. Furthermore, bytes accommodated in the overhead are demultiplexed. K bytes are transferred to both an APS processing unit and a mismatching judgement unit. The mismatching judging unit judges whether or not a WTR, DNR, RR, etc. are set in the K1 byte received from the opposite station, compares the mode of the opposite station with the mode of its own station, and detects a mismatching between the modes of the opposite and own stations. The result of the detection is transferred to the APS processing unit, and if there is a mismatching, the mismatching is solved.

12 Claims, 14 Drawing Sheets

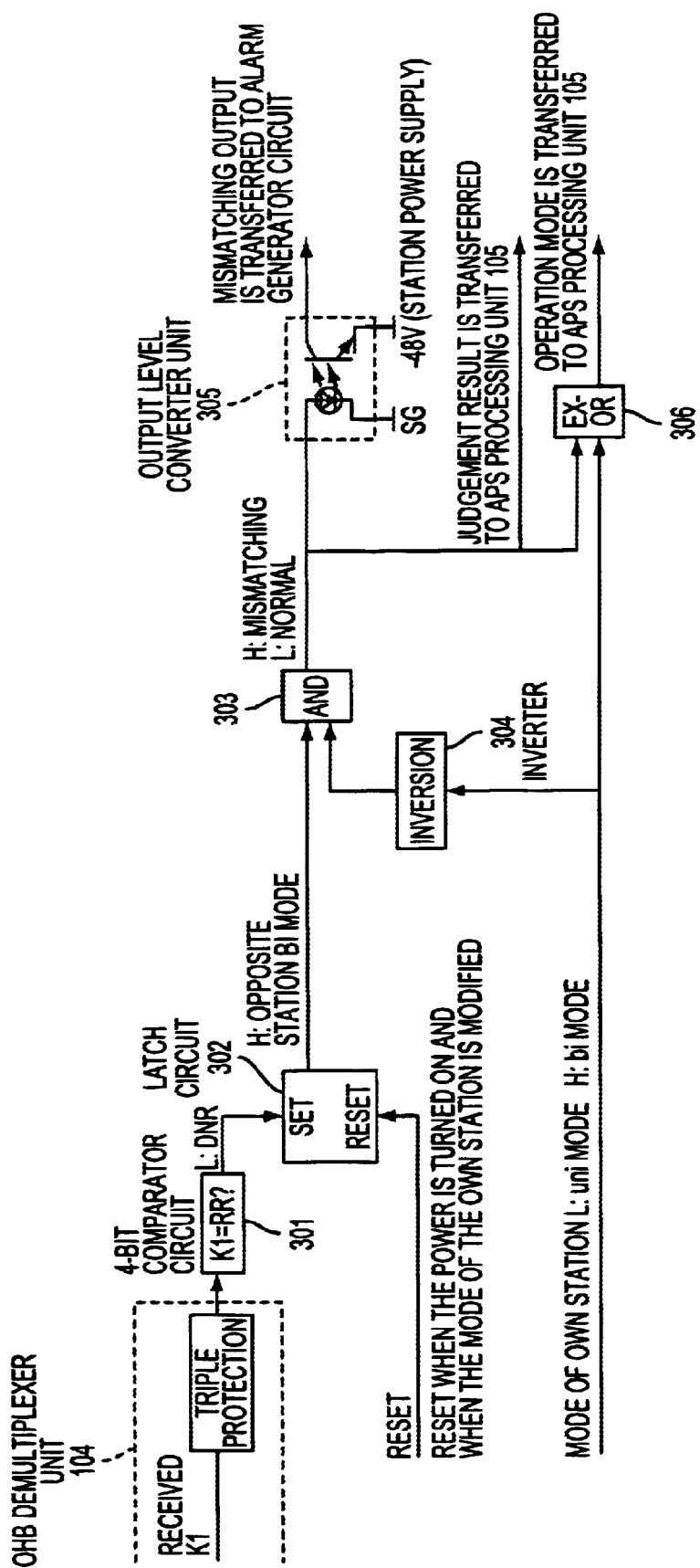
F I G. 1 2

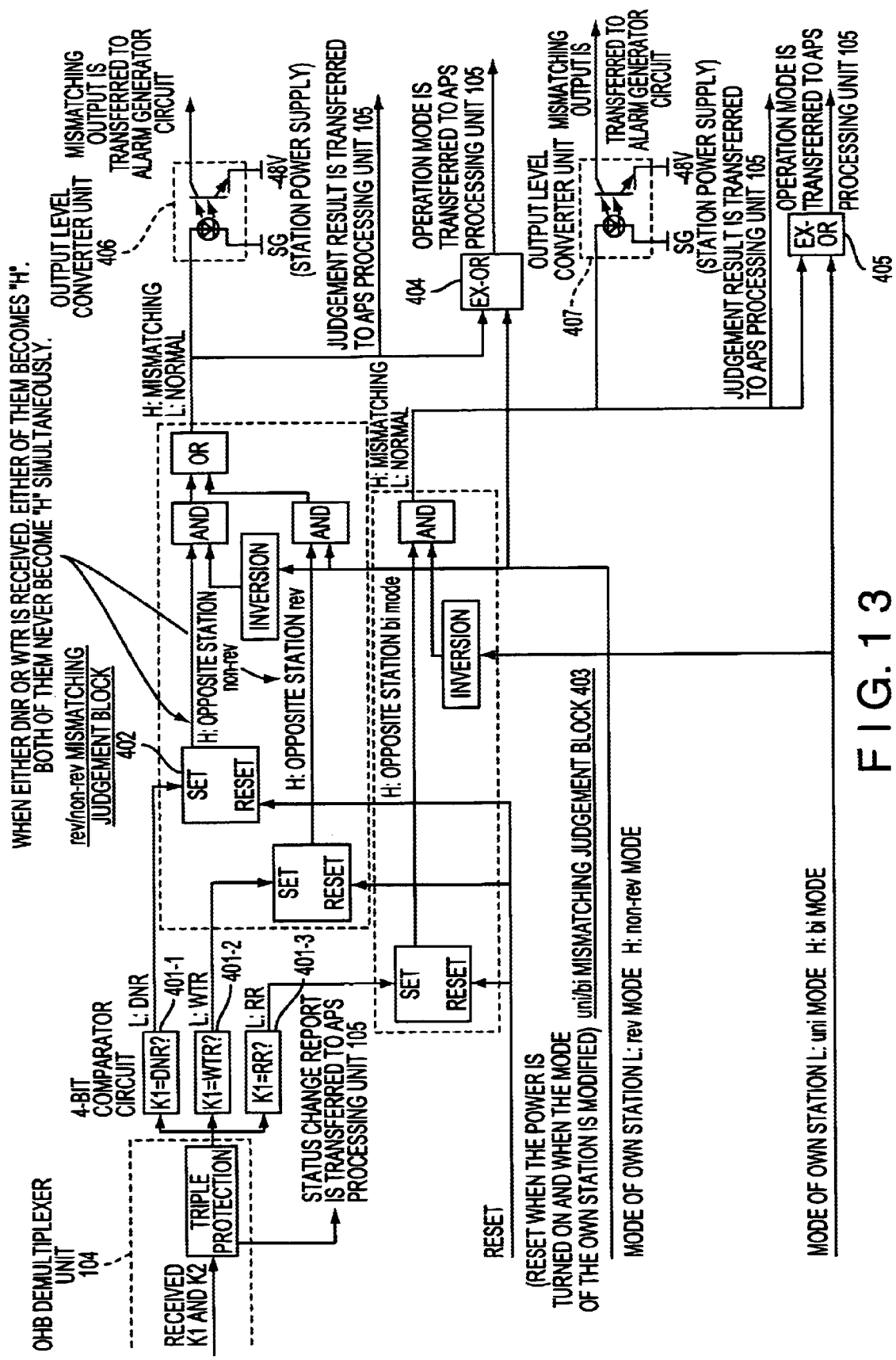
F I G. 13

TERMINAL APPARATUS, DEVICE FOR DETECTING THE MISMATCHING OF WORK/PROTECTION LINE BRIDGING FUNCTION IN A SYNCHRONOUS COMMUNICATION NETWORK AND THE METHOD

BACKGROUND OF THE INVENTION

1. Field of the Invention

The present invention relates to a system with a 1+1 switching function, applied to a synchronous communication network.

2. Description of the Related Art

A 1+1 switching function (1+1 MSP) based on ITU standards performs switching by transmitting and receiving K1 and K2 bytes provided in the overhead of the data frame in an SDH (Synchronous Digital Hierarchy) or SONET (Synchronous Optical NETwork) network as bytes for monitoring and controlling between an opposite apparatus and an own apparatus. In this case, the settings of the own apparatus are known, but the settings of the opposite apparatus are unknown, since in the K1 and K2 bytes there are no Revertive/Non-Revertive mode settings (in order to simplify, hereinafter revertive and non-revertive are called "rev" and "non-rev", respectively) and uni-directional/bi-directional mode settings (in order to simplify, hereinafter uni-directional and bi-directional are called "uni" and "bi", respectively) in the conventional North American SONET specifications. As a result, some failure occurs when the apparatuses are connected. (For details of K1 and K2 bytes, see ITU Recommendations G783.)

FIG. 1 explains the concept of a 1+1 MSP.

In a communication network where station A and station B being terminal stations are opposed, stations A and B comprise multiplexers 600 and 602 for multiplexing and demultiplexing received signals and transferring to signal processing units located at a latter stage (not shown in the diagram), and optical transmitter-receiver units 604 and 605 connected to optical transmission lines, for transmitting and receiving light beams. A running (work) line and a stand-by (protection) line each consist of a pair of an upward line and a downward line between the optical transmitter-receiver units 604 and 605 of stations A and B. Switches 601 and 602 are provided on the receiving side of the optical transmitter-receiver units 605 and 605, respectively, in stations A and B, and the switches 601 and 602 are to switch (bridge) the work and protection lines when a failure occurs. A switch for automatically preforming this bridging using the above-mentioned K1 and K2 bytes is called an "APS (Automatic Protection Switch)".

The configuration in FIG. 1 shows a 1+1 bridging function, and one protection line is provided for one work line. In a 1+1 MPS the transmitting side always continues to transmit the same signal in both the work line and the protection line, and the receiving side can receive the same signal by bridging the lines when a failure occurs. On the other hand, a bridging method in which the transmitting side does not always transmit the same signal to both lines, and starts transmitting a signal when the receiving side bridges the lines, is called a 1:1 MSP. Although in a 1:1 MSP one protection line is provided for one work line, a bridging method in which one protection line is provided for a plurality (N pieces) of work lines is called a 1:N MSP.

The above-mentioned rev mode and non-rev mode differ in whether or not a bridged protection line is bridged back the original work line when the failure is repaired. That is, in the case of a rev mode, the bridged protection line and the original work line are bridged back when the failure is repaired, and in the case of a non-rev mode the bridged protection line and the original work line are not bridged back. In the case of a uni mode, for example, when a failure is detected in station B, only on the receiving side of station B are the work line and a protection line bridged, and station A does nothing. On the other hand, in the case of a bi mode, when a failure is detected in station B and the work line and a protection line are bridged, this information is also transmitted to station A, and in station A too, the work line and a protection line are bridged.

FIGS. 2 through 9 explain the problems caused by K1 and K2 bytes without the settings of a rev or non-rev mode, and a uni or bi mode.

FIGS. 2 through 5 show the case where a terminal station with a rev mode and a terminal station with a non-rev mode are opposed, and FIGS. 6 through 9 show the case where a terminal station with a uni mode and a terminal station with a bi mode are opposed. In these diagrams a 1+1 MSP is presumed, and the diagrams are indicated in a 1:N compatible mode. Although an optimized 1+1 MSP based on the above-mentioned ITU Recommendations differs from a 1:N MSP in the way of using the K1 and K2 bytes set in the overhead of a data frame in an SDH or SONET network, the 1:N compatible mode of a 1+1 MSP means that in a 1+1 MSP K1 and K2 bytes are used in the same way as in a 1:N MSP.

FIG. 2 explains the case where the own station is in a uni and rev mode, and the opposite station is in a uni and non-rev mode.

When there is no failure, a signal in which an NR (No Request) and "0s" are respectively assigned to K1 and K2 bytes, is transmitted from each terminal station. That is, there is no request for an APS. In the same way, an NR is transmitted from the opposite station too. In this way, when there is no failure, the NR continues to be exchanged between the own station and the opposite station. When a failure is detected in the work line of the own station, an SF (Signal Failure) is set in the K1 byte and is transmitted to the opposite station. This indicates that a failure has occurred in a work line for transmitting signals from the opposite station to the own station. Therefore, when receiving an SF from the own station, the opposite station sets in the K2 byte a line number for commanding which protection line to use in order to bridge the work line, and transmits the line number to the own station. When receiving this line number, the own station bridges the work line and a protection line of the line number designated in the K2 byte which is transmitted from the opposite station, sets information that the work line is in a status of failure in the K1 byte as an SF, and transmits the information to the opposite station. At this time, although the work line for transmitting signals from the opposite station is out of order, the protection line also transmits the same information, and both the own and opposite stations always use the protection line to receive the K1 and K2 bytes. Accordingly, even if there is any failure in the work line, the K1 and K2 bytes are normally received. It is because bridging is meaningless if there is also a failure in the protection line when there is a failure in a work line, and the protection line is presumed to be normal when the bridging is performed so that a protection line is used to transmit and receive K1 and K2 bytes in this way. While the protection line is used, from the own station an SF continues to be transmitted, and the line signal of the protection line continues to be transmitted from the opposite station. When it is detected on the own station side that the failure of the work line is repaired, the protection line is bridged back over to the work line, and an NR is transmitted to the opposite station. When the opposite station has received the NR, the opposite station judges that the work line is restored, and also transmits an NR to the own station. In this way, when bridging and bridging-back due to a failure are performed on the own station side with a uni and rev mode, there is no problem.

FIG. 3 explains the case where the own station is in a uni and non-rev mode, and the opposite station is in a uni and rev mode.

In this drawing too, when there is no failure in both the own and opposite stations, a K1 byte is transmitted as an NR consisting of "0s". When there is a failure in the own station, an SF is set in the K1 byte in the own station, and the K1 byte is transmitted to the opposite station in the same way as described in FIG. 2. When receiving the K1 byte, the opposite station sets a line number for a protection line in the K2 byte, and transmits the K2 byte to the own station. The own station bridges the work line and a protection line according to the command of this line number. Since a protection line is used to transmit and receive K1 and K2 bytes as described above, there is no problem in the transmission of the K1 and K2 bytes even when there is a failure in the work line. After bridging the work line and a protection line, the own station sets an SF in the K1 byte in order to indicate that the work line is out of order, and transmits the K2 byte to the opposite station. The opposite station sets a line number for a protection line in the K2 byte, and transmits the K2 byte to the own station. Such transmission and reception of K1 and K2 bytes are repeated until the failure is repaired. When it is detected that the failure is repaired, the own station stop transmitting an SF. However, since the own station is in a non-rev mode, the own station sets a DNR (Do Not Revert) in the K1 byte, and transmits the K1 byte to the opposite station. This means that the own station does not bridge back to the work line. On the other hand, since the opposite station in a rev mode, the opposite station waits for an NR for indicating that the failure of the work line is repaired. Under these circumstances, since instead of an NR which is transmitted when there is no failure a DNR is transmitted to the opposite station, mismatching between rev and non-rev modes occurs. Although what kind of process is executed depends on the design of the apparatus when the opposite station receives the DNR, in the worst case the line may be disconnected. Alternatively, as shown in the diagram, the opposite station may judge that the failure is not yet repaired, and may transmit a K2 byte with a line number for a protection line. Meanwhile, since the own station waits for a reply to the DNR, communication may be continued in a status where neither of the stations can ever get an expected reply. Alternatively, the status may be judged to be an error, and the bridging may get into trouble.

FIG. 4 explains the case where the own station is in a bi and rev mode, and the opposite station is in a bi and non-rev mode.

When there is no failure, an NR is exchanged between the own and opposite stations. When it is detected that there is a failure in the own station, the own station sets an SF in the K1 byte, and transmits the K1 byte to the opposite station. The opposite station bridges the work line and a protection line, sets a line number for the protection line to be bridged in the K2 byte, and transmits the K2 byte to the own station. It is in order to indicate in which direction the failure occurs that in this case the K1 byte transmitted from the opposite station is set to "00100001", which is stipulated in ITU Recommendations mentioned earlier. When receiving the K1 and K2 bytes from the opposite station, the own station bridges the work line and a protection line, sets a line number of the bridged protection line and an SF in the K2 and K1 bytes, respectively, and transmits the K1 and K2 bytes to the opposite station. When receiving the K1 and K2 bytes, the opposite station verifies that the K1 and K2 bytes are designated by the bridged protection line, and returns the signal in which "00100001" for indicating failure information and the line number of the protection line are set in the K1 and K2 bytes, respectively, to the own station. When receiving the K1 and K2 bytes, the own station transmits a WTR (Wait To Restore) for commanding the opposite station to wait for the repair of the failure in the work line, and transmits the K1 bytes to the opposite station, since the own station is in a rev mode. At this time in the K2 byte the line number of the protection line is set. On the other hand, since the opposite station is in a non-rev mode, the opposite station waits for a signal with an SF set in the K1 byte. Therefore, when receiving the WTR, the bridging gets into trouble, since the opposite station receives an unexpected signal. Although what actually occurs depend on the design of the apparatus, both the own and opposite stations enter a status where an expected signal is never received. If, even when receiving the WTR, the opposite station holds the bridging status, the opposite station continues to transmit a signal in which failure information and the line number of the protection line are set in the K1 and K2 bytes, respectively, to the own station.

FIG. 5 explains the case where the own station is in a bi and non-rev mode, and the opposite station is in a bi and rev mode.

As described earlier, when there is no failure, an NR is set in the K1 byte, the K1 byte is exchanged, and thereby there is no problem. When it is detected in the own station that there is a failure in the work line, an SF is set in the K1 byte in the own station, and the K1 byte is transmitted to the opposite station. When receiving the K1 byte, the opposite station sets failure information and the line number of the protection line in the K1 and K2 bytes, respectively, and transmits the K1 and K2 bytes to the own station. When receiving the K1 and K2 bytes, the own station bridges the work line and a protection line. Then, the own station sets an SF and the line number of a protection line in the K1 and K2 bytes, and transmits the K1 and K2 bytes to the opposite station. Then, the exchange of such signals is continues until the failure is repaired. When the failure is repaired, since the own station is in a non-rev mode, it sets a DNR for requesting not to bridge back to the work line in the K1 byte, and transmits the signal to the opposite station. However, since the opposite station is in a rev mode, the opposite station waits to receive a WTR. Thus, a mismatching of mode occurs. Although what kind of problem is caused by this mismatching of mode depends on how the actual apparatus is designed, in the worst case signals are disconnected. When the opposite station is configured so as to hold the bridging status as it is after receiving the DNR, as shown in the diagram, failure information and the line number of the protection line are set in the K1 and K2 bytes, respectively, and the signal is transmitted to the own station.

FIG. 6 explains the case where the own station is in a uni and rev mode, and the opposite station is in a bi and rev mode.

When a failure is detected in the own station, the information is transmitted to the opposite station as the SF of the K1 byte. Since the opposite station is in a bi mode, the opposite station bridges the work and protection lines, and transmits an RR (Reverse Request) being a request for bridging to the own station. When receiving the RR, the own station reads the protection line number in the K1 byte, and bridges the work and protection lines. Since the own station is in a uni mode, the own station sets an SF for indicating that the work line out of order in the K1 byte, and transmits the signal to the opposite station. Although the opposite station waits for the signal from the own station in which the line number of the protection line is set in the K2 bytes, in the K2 byte the same line number as the K2 byte transmitted from the opposite station together with the RR is not set, since the own station is in a uni mode. Therefore, a channel (ch) mismatching occurs, and after a predetermined time (50 milli-seconds later) an alarm sounds. Since the opposite station is in a bi mode, the opposite station continues to wait for the signal in which the channel is set in the K2 byte. Meanwhile, since the own station is in a uni mode, the own station only continues to transmit an SF. This situation continues until the failure is repaired. When the failure is repaired, the own station bridges back between the work and protection lines (the own station is in a rev mode), and transmits an NR to the opposite station. When receiving the NR, the opposite station bridges back between the work and protection lines. Thus, the number of the line currently used by the K2 byte transmitted from the own station and the number of the line currently used by the K2 byte transmitted from the opposite station coincide with each other, and thereby the channel mismatching is solved. In this way, in the case of FIG. 6, a channel mismatching alarm continues to sound until the failure is repaired. Even in this case, there is a possibility that the bridging status gets into trouble due to a channel mismatching.

FIG. 7 explains the case where the own station is in a bi and rev mode, and the opposite station is in a uni and rev mode.

As described earlier, when there is no failure, an NR is exchanged between the own and opposite stations. When a failure is detected in the own station, a K2 byte with an SF is transmitted from the own station. When receiving the K2 byte, the opposite station sets the line number of the protection line to be used in the K2 byte, and returns the K2 byte to the own station. Since the opposite station is in a uni mode, there is no problem. Meanwhile, since the own station is in a bi mode, the own station waits for an RR from the opposite station. However, since nothing is set in the K1 byte transmitted from the opposite station, a channel mismatching occurs on the own station side, and after a predetermined time (50 milli-seconds in the case of FIG. 7) an alarm sounds. Although the own station continues to transmit an SF to the opposite station, the opposite station continues to transmit a signal in which "0s" and the line number are set in the K1 and K2 bytes, respectively, to the own station, since the opposite station is in a uni mode. This situation continues until the failure is repaired.

When the repair of the failure is detected in the own station, the work line is restored to normal conditions, an NR is transmitted from the own station, and thereby the channel mismatching is solved. The opposite station receives an NR from the own station, and transmits an NR to the own station.

In this way, since on the own station side the failed work line is bridged by a protection line, the own station waits for an RR from the opposite station. However, since the RR is never transmitted, the own station cannot bridge the lines. Accordingly, an APS unit cannot operate normally due to the channel mismatching.

FIG. 8 explains the case where the own station is in a uni and non-rev mode, and the opposite station is in a bi and non-rev mode.

When there is no failure, an NR is exchanged between the own and opposite stations. When a failure is detected in the own station, an SF is set in the K1 byte in the own station, and the K1 byte is transmitted from the own station. When receiving the K1 byte, the opposite station bridges the lines on the transmitting side, sets an RR and the protection line number in the K1 and K2 bytes, respectively, and transmits the K1 and K2 bytes to the own station. The own station reads the protection line number in the K2 byte transmitted from the opposite station, bridges the failed work line and a protection line, and transmits an SF to the opposite station. Since the opposite station is in a bi mode, the opposite station expects a signal of which the number of the bridged protection line is set in the K2 byte. However, since the own station is in a uni mode, the opposite station cannot get the expected signal. Accordingly, the opposite station judges that a channel mismatching occurs, and after a predetermined time an alarm sounds. Although the opposite station continues to transmit an RR hoping to get the expected reply, such a reply is not returned from the own station, and thereby the channel mismatching continues. When the repair of the failure is detected in the own station, a DNR is transmitted from the own station to the opposite station. However, as the line number of the bridged protection line is not still set in the K2 byte, the opposite station judges that the line of the line number designated by the opposite station is not bridged, and thereby the channel mismatching continues. In this case, the bridging status gets into trouble, and in the worst case there is a possibility that the signals may be disconnected.

FIG. 9 explains the case where the own station is in a bi and non-rev mode, and the opposite station is in a uni and non-rev mode.

When the occurrence of a failure is detected in the own station, K bytes (K1 and K2 bytes) transmitted from the own station change from NR to SF. When receiving the K bytes, the opposite station sets the line number of a protection line to be bridged in a K2 byte, and transmits the K2 byte to the own station. However, since the own station is in a bi mode, the own station waits for an RR. Accordingly, when the own station receives the K bytes from the opposite station, a channel mismatching occurs. Although the own station continues to transmit an SF until an RR is transmitted from the opposite station, the status where an RR cannot be received continues. When the repair of the failure is detected in the own station, the own station transmits a DNR, since the own station is in a bi and non-rev mode. However, since the opposite station waits for an NR, the bridging process does not operate normally, and thereby the channel mismatching continues.

As described above, since conventionally there are no mode settings of rev/non-rev and bi/uni in the K1 and K2 bytes, the own station cannot know the mode of the opposite station. Accordingly, there is a good possibility that an APS unit may not operate normally, such as the facts that a channel mismatching alarm sounds for ever, signals are disconnected depending on the design of an apparatus, etc.

SUMMARY OF THE INVENTION

It is an object of the present invention to provide a failure detection apparatus for detecting the mode of an opposite station and matching the mode of the own station with the mode of the opposite station in a synchronous communication network.

The terminal station of the present invention is a terminal station in a synchronous communication network where data are exchanged in units of frames including an overhead for storing a control signal, and is characterized in comprising an extraction unit for extracting information for indicating request contents needed to execute a process of automatically bridging a work line and a protection line from a received overhead, a mismatching judgment unit for judging a mismatching between the work/protection line bridging mode of a terminal station transmitting the information and the work/protection line bridging mode of the own terminal station by judging whether or not the request contents of the information are not used in the work/protection line bridging mode of the own terminal station, and an automatic bridging unit for matching based on the judgement result of the mismatching judgement unit the work/protection line bridging mode of the own terminal station with the work/protection line bridging mode of a terminal station transmitting the information.

The apparatus of the present invention is a mismatching detection apparatus for detecting the mismatching of an inter-station operation mode relating to an automatic work/protection line bridging process provided in terminal stations in a SONET or SDH communication network, and is characterized in comprising a comparison unit for judging whether or not a predetermined request relating to the work/protection line bridging process is set in K bytes extracted from signals received by the own terminal station, and a mode judgement unit for comparing the operation mode of a terminal station transmitting the signal which is obtained from the judgement result of the comparison unit with the operation mode of the own terminal station, judging whether or not both operation modes coincide with each other, and outputting the result of the judgement.

The method in the first aspect of the present invention is an operation mode mismatching judging method for terminal stations in a synchronous communication network where data are exchanged in units of frames including an overhead for storing a control signal, and is characterized in comprising (a) a step of extracting information indicating request contents needed to execute a process for automatically bridging a work line and a protection line from a received overhead, (b) a step of judging a mismatching between the work/protection line bridging mode of a terminal station transmitting the information and the work/protection line bridging mode of the own terminal station by judging whether or not the request contents of the information are not used in the work/protection line bridging mode of the own terminal station and (c) a step of matching based on the judgement result of step (b) the work/protection line bridging mode of the own terminal station with the work/protection line bridging mode of a terminal station transmitting the information.

The method in the second aspect of the present invention is a mismatching detecting method for detecting the mismatching of an inter-station operation mode relating to an automatic work/protection line bridging process provided in terminal stations in a SONET or SDH communication network, and is characterized in comprising (a) a step of judging whether or not a predetermined request relating to the work/protection line bridging process is set in K bytes extracted from signals received by the own terminal station and (b) a step of comparing the operation mode of a terminal station transmitting the signal which is obtained from the judgement result of the step (a) with the operation mode of the own terminal station, judging whether or not both operation modes coincide with each other, and outputting the result of the judgement.

According to the present invention, the mode of an opposite station can be detected by judging whether or not the contents of transmitted information are unique to a specific operation mode even if information on the operation modes of both terminal stations executing the bridging process is not set in information for an automatic work/protection line bridging process provided in the overhead of a frame exchanged between terminal stations through a synchronous communication network. Thus, it can be known whether or not there is a mode mismatching by comparing the detected operation mode of the opposite station with the operation mode of the own station. Thus, the supervisor of the network can operate so as to match the modes of both terminal stations. A terminal station itself can automatically solve the mismatching of an operation mode between the opposite station and the own station by modifying the operation mode of the own station.

Accordingly, inconveniences due to the design of an actual apparatus such as the continuation of alarm sounding, the disconnection of signals, etc. due to the mismatching of operation modes can be avoided. Even when two terminal stations in communication are manufactured by different makers, unexpected inconveniences due to the mismatching of operation modes can be avoided by a work/protection line bridging process and can continue to be normally operated.

BRIEF DESCRIPTION OF THE DRAWINGS

FIG. 12 is a block diagram of a circuit for judging the uni/bi mode of a mismatching judgement unit.

FIG. 13 is a circuit block diagram of a mismatching judgement unit with the judgement configuration of both rev/non-rev mode and uni/bi mode.

DESCRIPTION OF THE PREFERRED EMBODIMENTS

In order to solve the above described conventional problem, a mismatching shall be judged and the operation mode of the own apparatus shall be automatically modified by continuously monitoring information set in the own apparatus (own station) and the contents of K1 and K2 bytes transmitted from a partner (opposite station), waiting for the K1 command for distinguishing the partner's mode, and comparing the partner's mode with the own mode.

Figure 1:
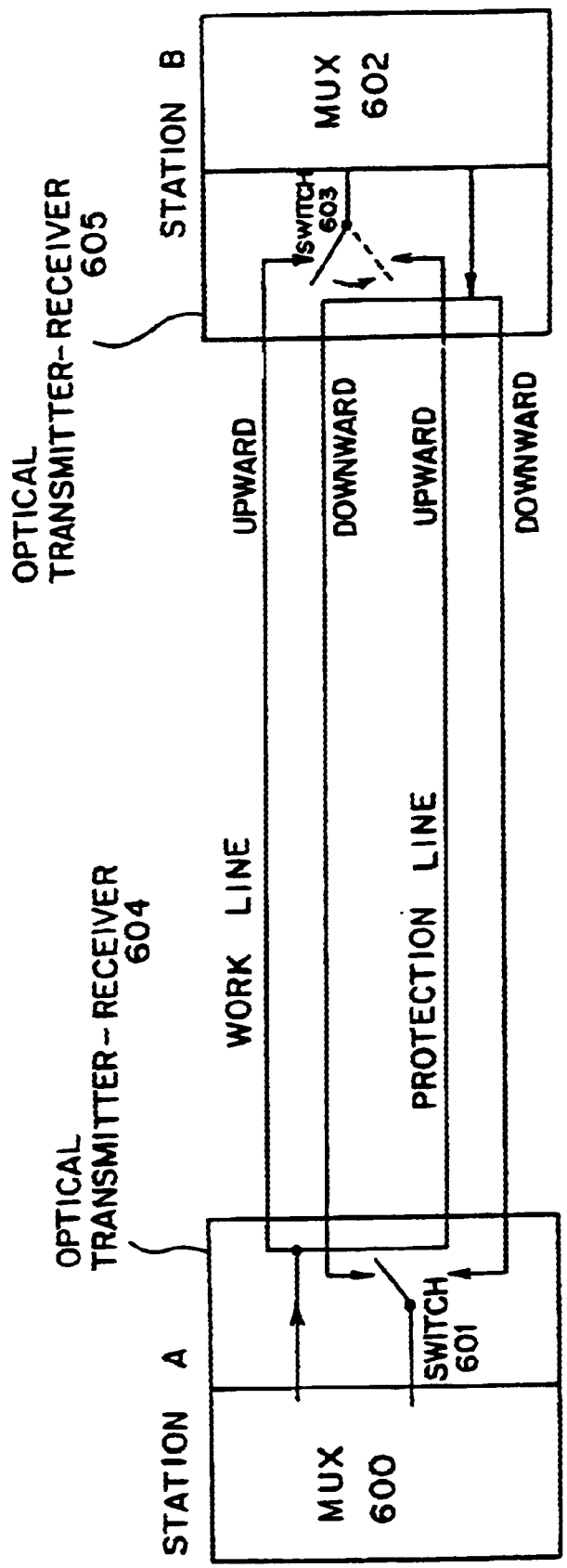
FIG. 1 explains the concept of a 1+1 MSP.
Figure 2:
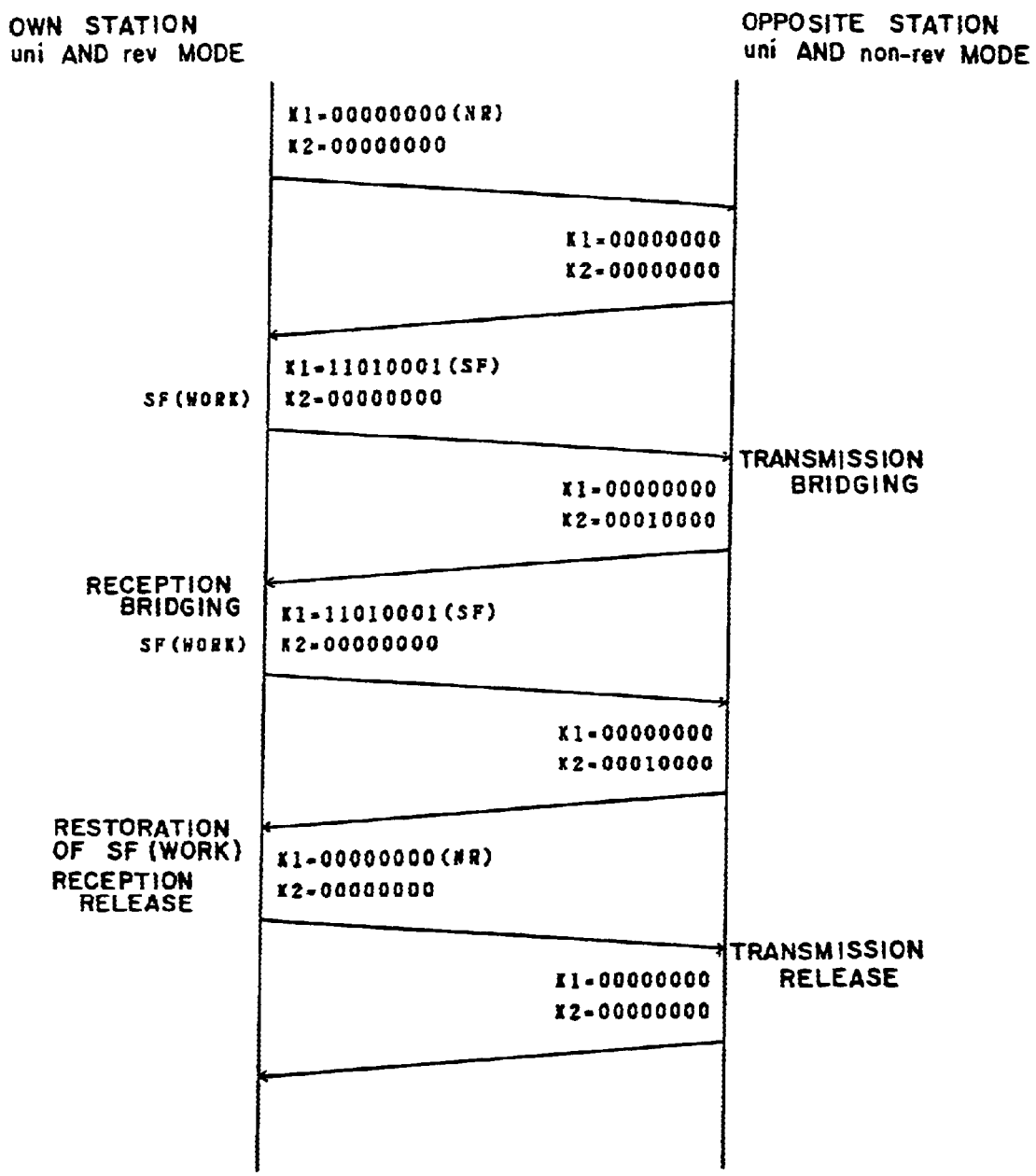
FIG. 2 explains the problems caused by K1 and K2 bytes without the settings of a rev or non-rev mode, and a uni or bi mode (No.1).
Figure 3:
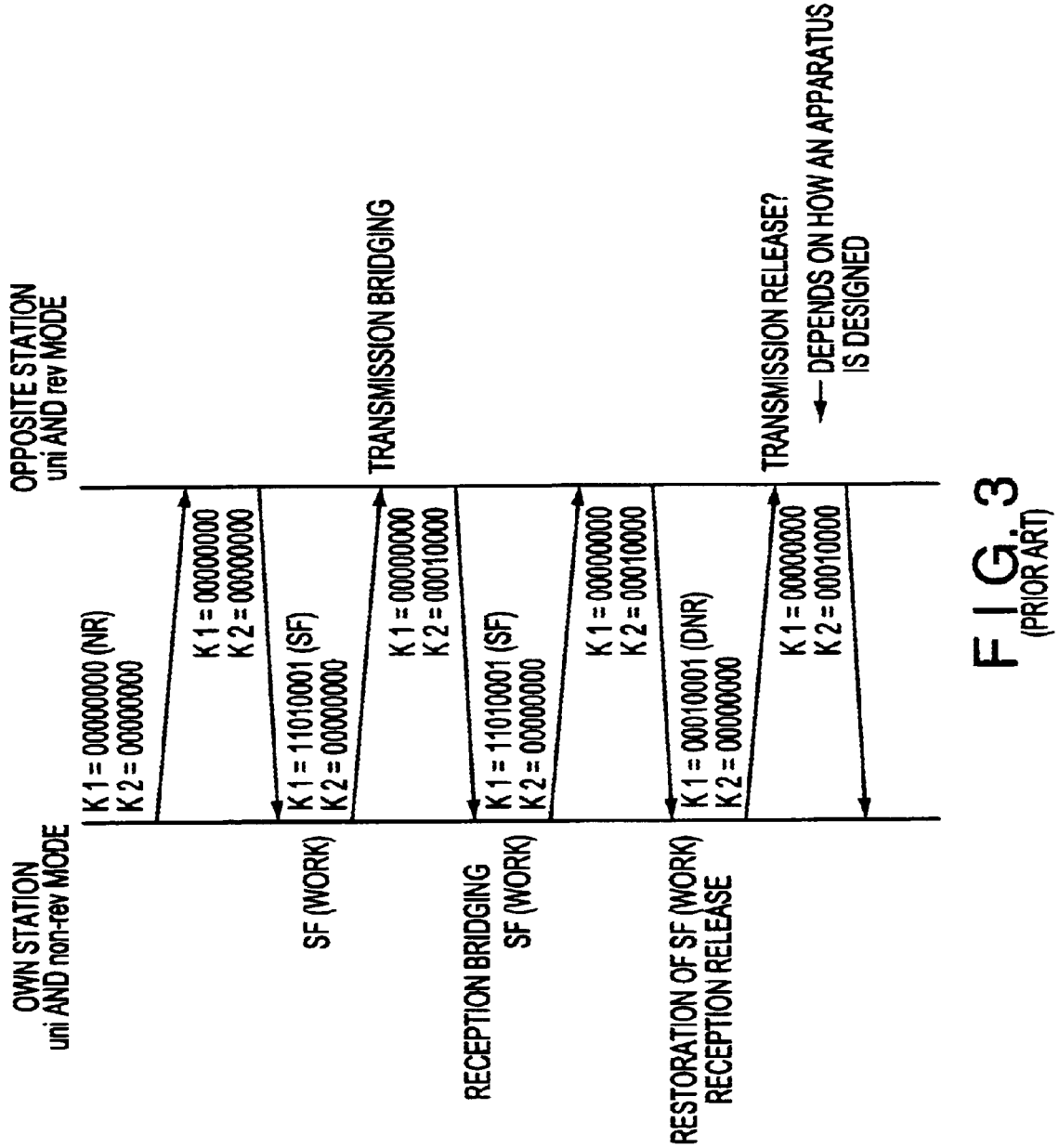
FIG. 3 explains the problems caused by K1 and K2 bytes without the settings of a rev or non-rev mode, and a uni or bi mode (No.2).
Figure 4:
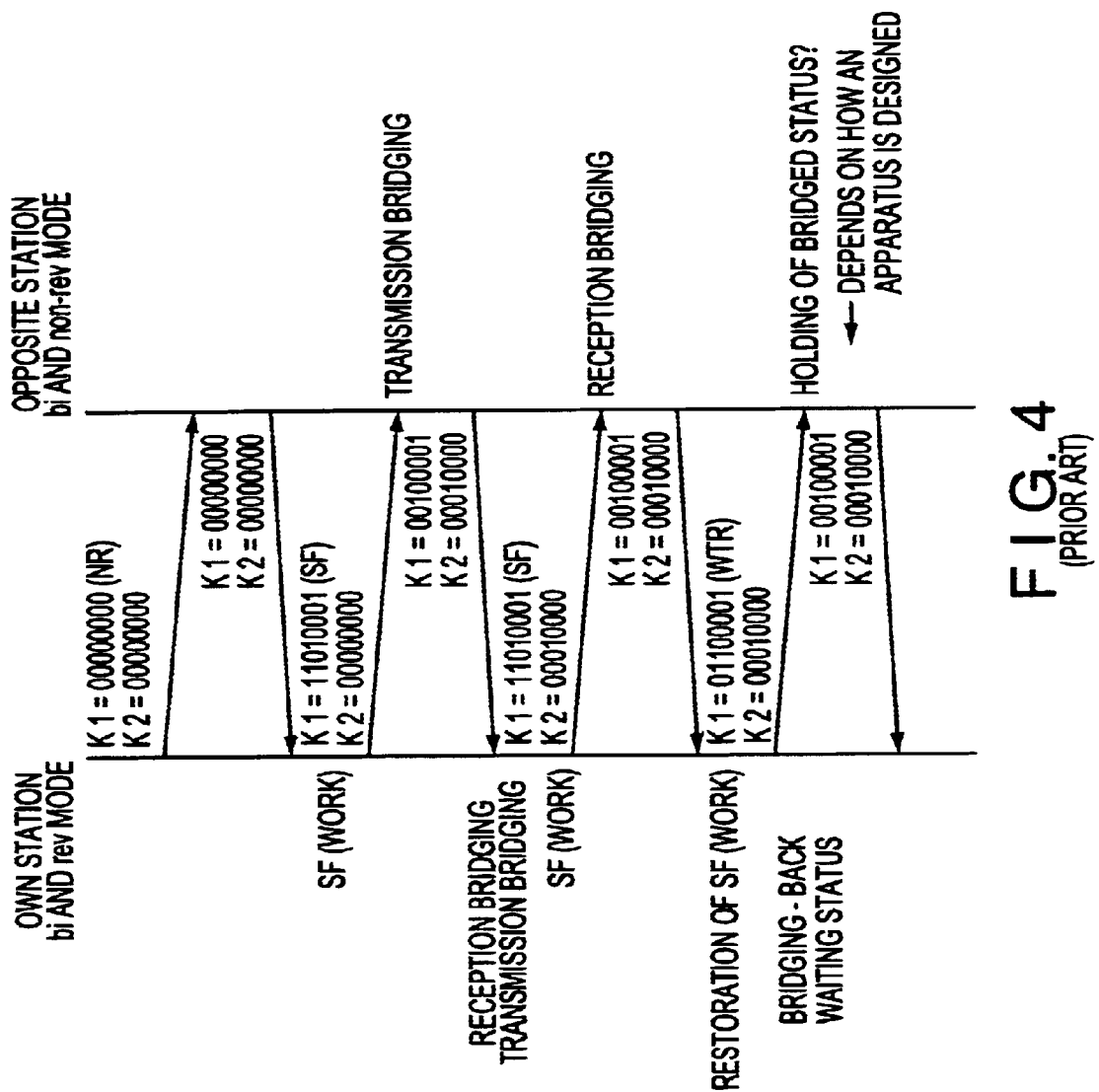
FIG. 4 explains the problems caused by K1 and K2 bytes without the settings of a rev or non-rev mode, and a uni or bi mode (No.3).
Figure 5:
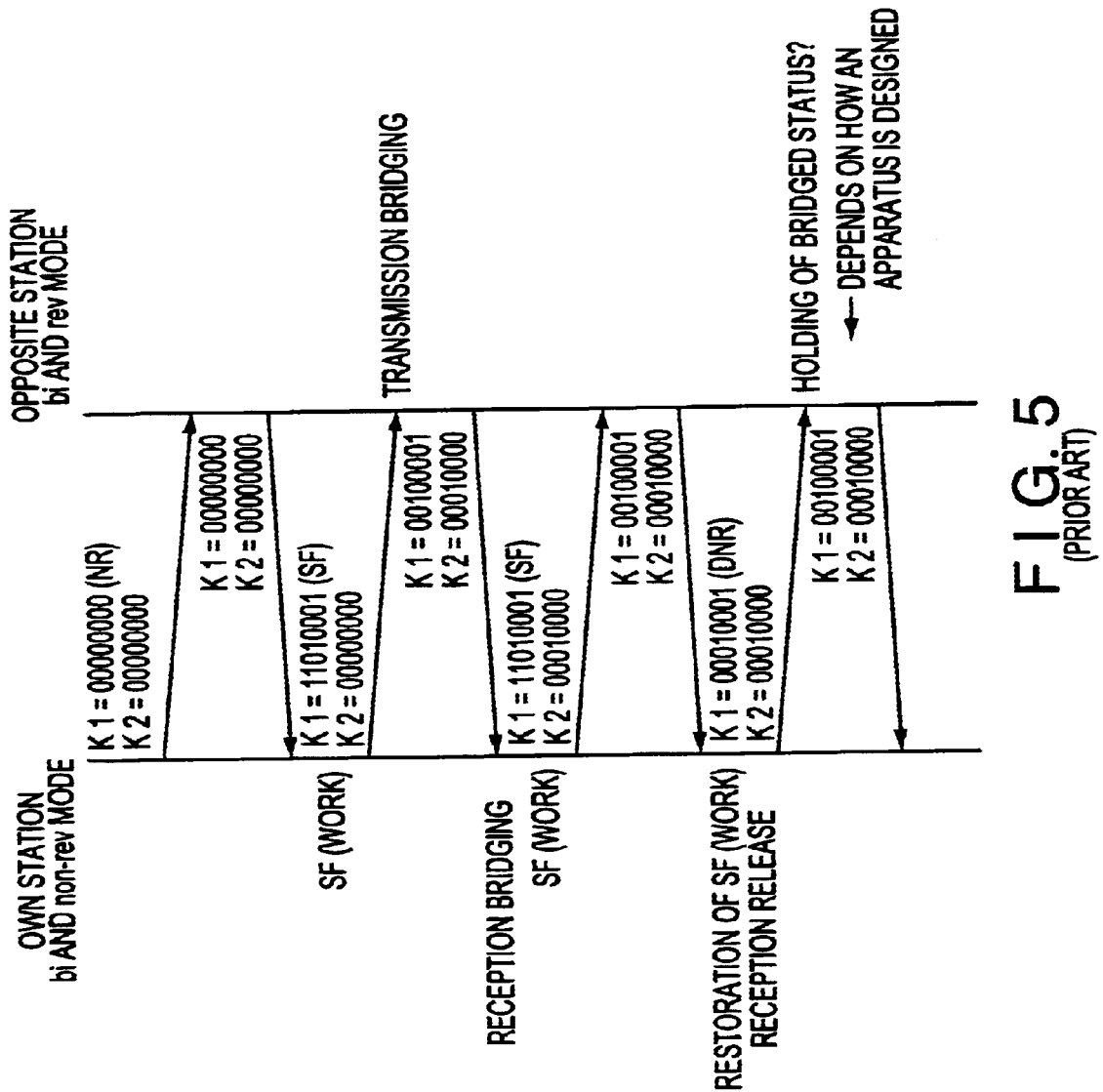
FIG. 5 explains the problems caused by K1 and K2 bytes without the settings of a rev or non-rev mode, and a uni or bi mode (No.4).
Figure 6:
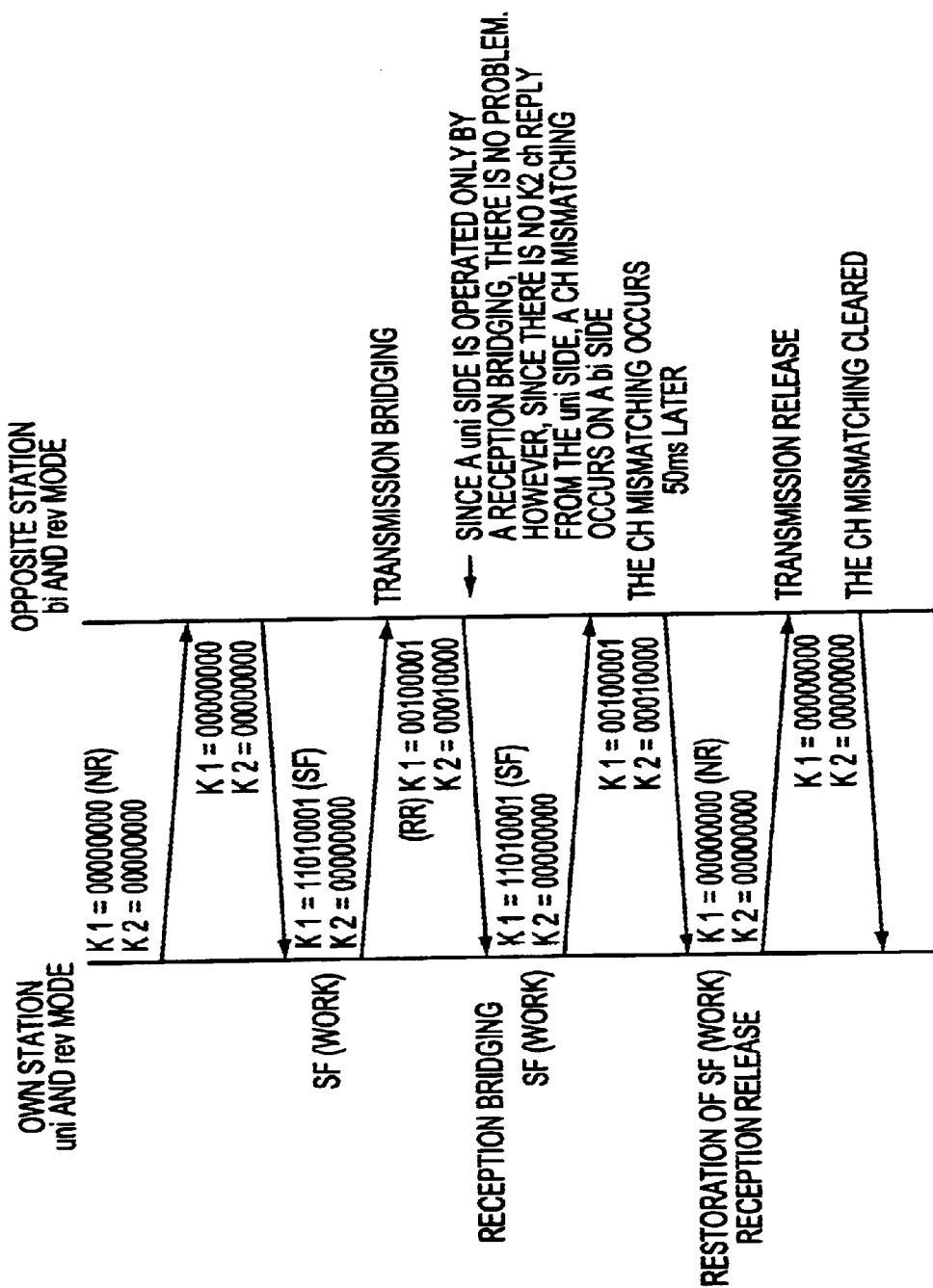
FIG. 6 explains the problems caused by K1 and K2 bytes without the settings of a rev or non-rev mode, and a uni or bi mode (No.5).
Figure 7:
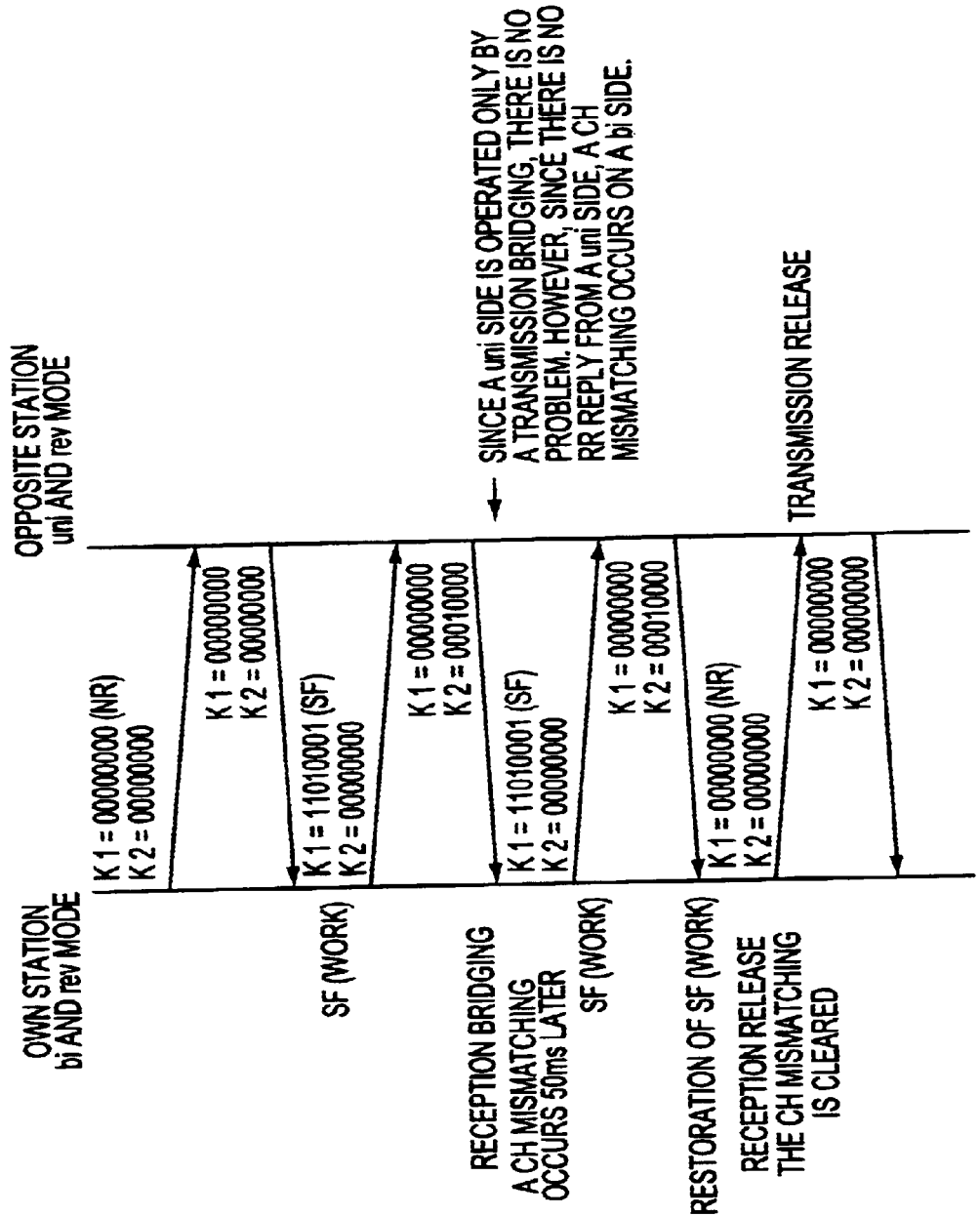
FIG. 7 explains the problems caused by K1 and K2 bytes without the settings of a rev or non-rev mode, and a uni or bi mode (No.6).
Figure 8:
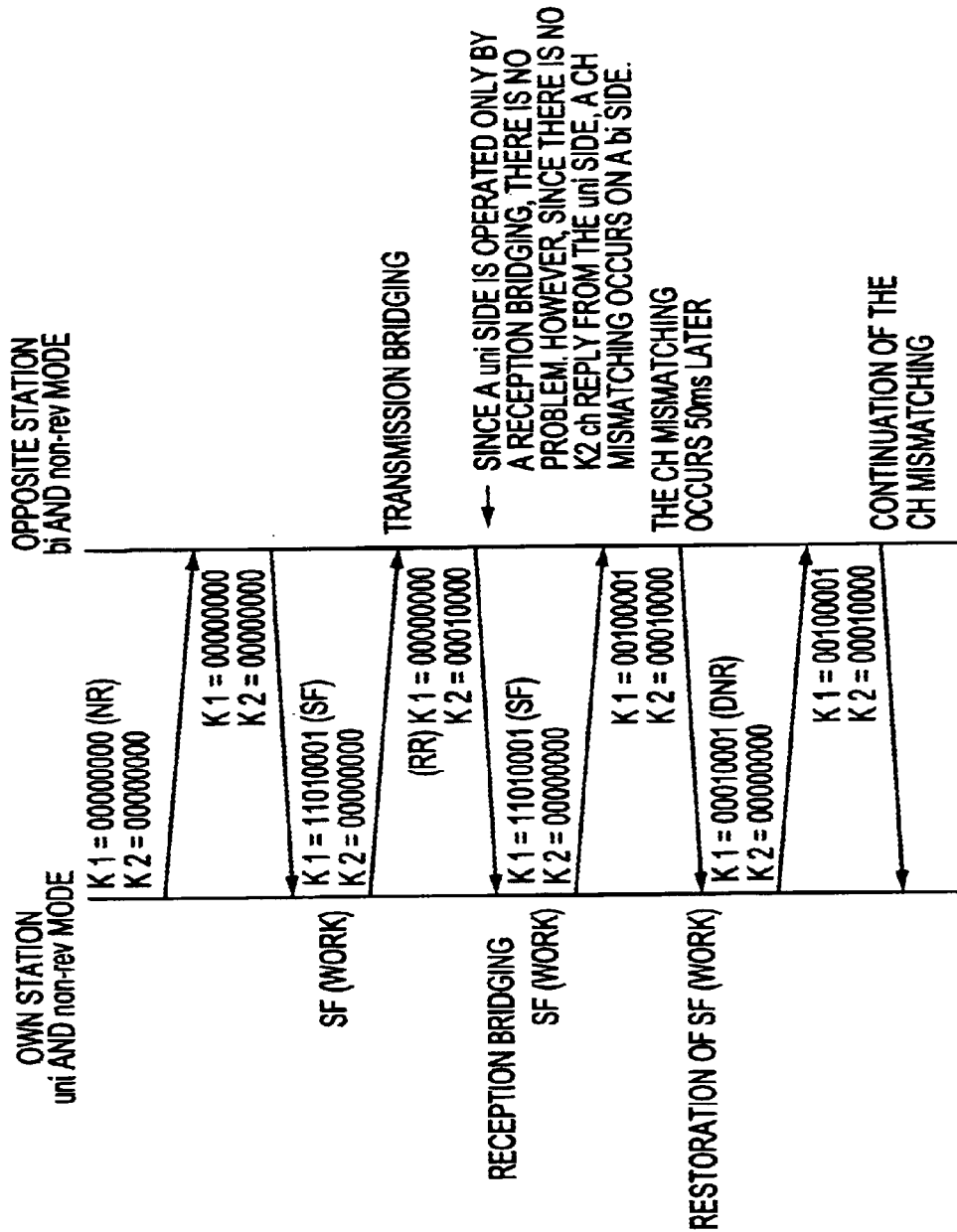
FIG. 8 explains the problems caused by K1 and K2 bytes without the settings of a rev or non-rev mode, and a uni or bi mode (No.7).
Figure 9:
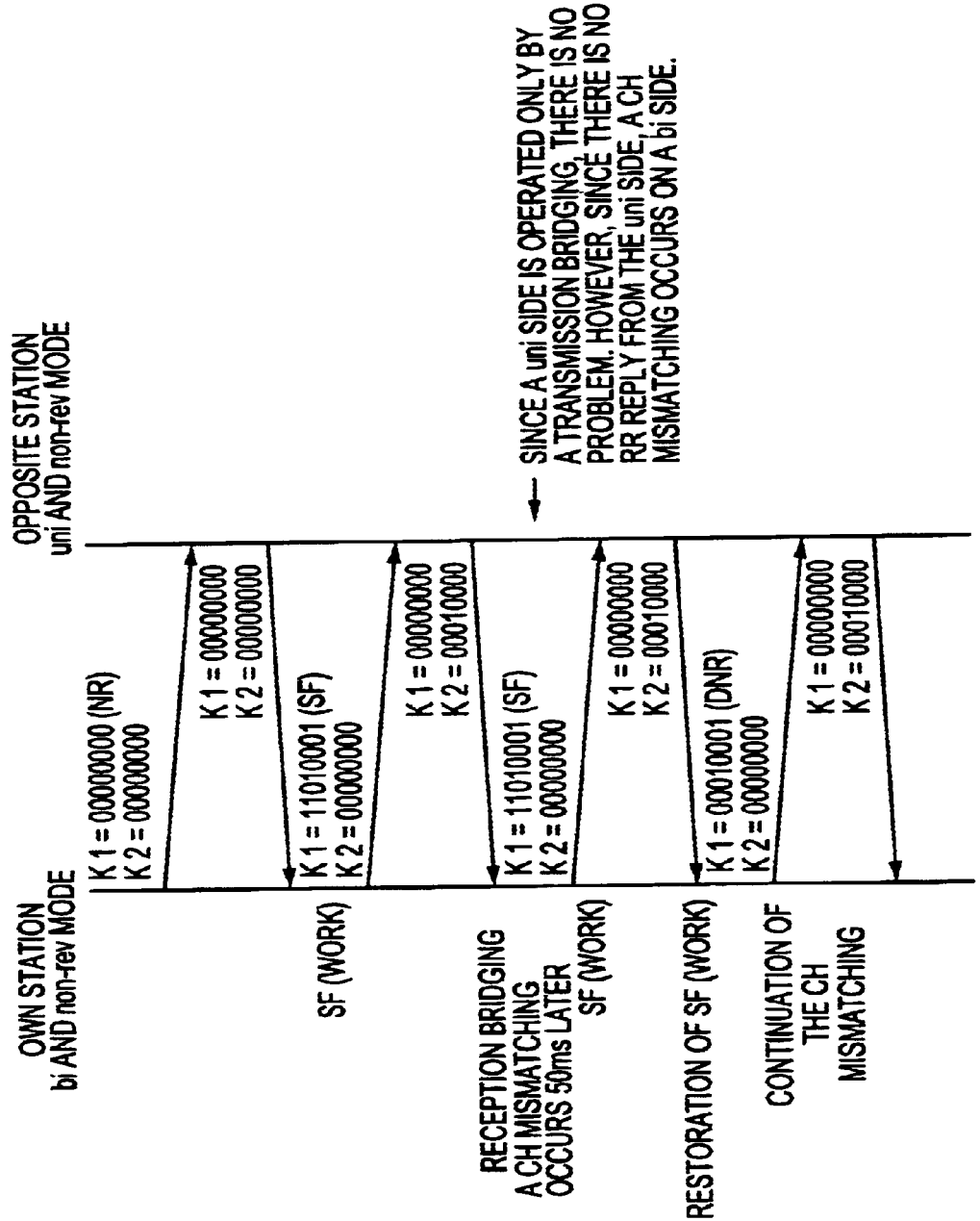
FIG. 9 explains the problems caused by K1 and K2 bytes without the settings of a rev or non-rev mode, and a uni or bi mode (No.8).
Figure 10:
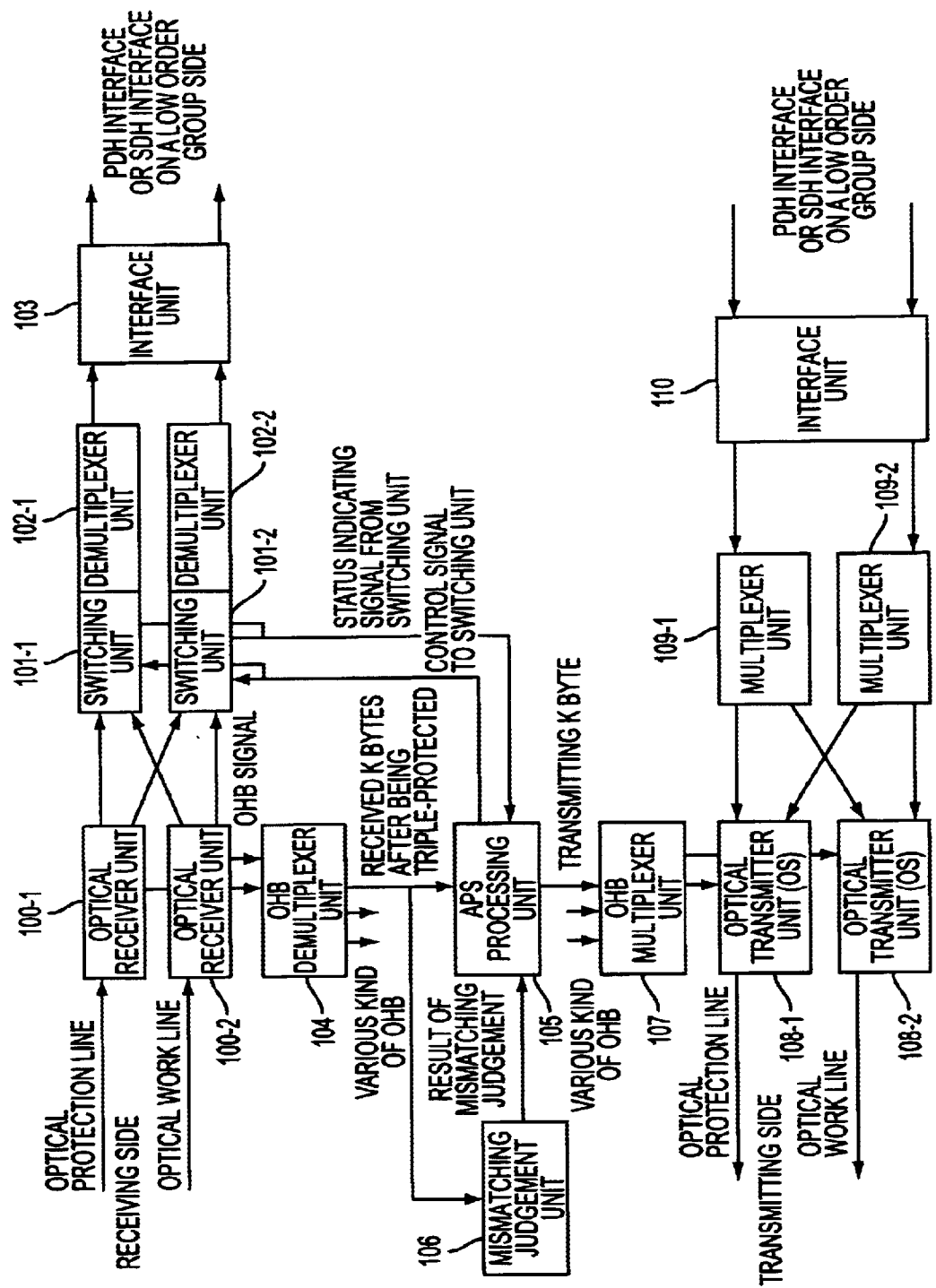
FIG. 10 is a block diagram showing the configuration of a terminal station (the own station or an opposite station) according to the embodiment of the present invention.

FIG. 10 is a block diagram showing the configuration of a terminal station (the own station or an opposite station) according to the embodiment of the present invention.

In the present invention a mismatching judgement circuit 106 is provided for extracting K bytes from an overhead byte (OHB) demultiplexer unit 104, judging a mismatching between the opposite station and the own station, and inputting the result to an APS processing unit 105. For the transmission lines optical lines are provided, and a pair of a work line and a protection line are provided on both the receiving and transmitting sides. Optical receiver units 100-1 and 100-2 are connected to the protection and work lines, respectively, on the receiving side, and convert transmitted optical signals to electric signals. The overhead of a frame which consists of the transmitted signals is extracted by the optical receiver units 100-1 and 100-2, and transferred to the overhead byte demultiplexer unit 104. On the other hand, the payload of the frame is transmitted on both the optical work and protection lines, and the payload is inputted to both of the switching units 101-1 and 101-2. The switching units 101-1 and 101-2 bridge the lines for an APS according to an inputted control signal. The signals of the line selected by the switching units 101-1 and 101-2 are demultiplexed to signals for each channel by demultiplexers 102-1 and 102-2, and transferred to an interface unit 103. Although it is shown in the diagram that each of the demultiplexers 102-1 or 102-2 and the interface 103 are connected by one cable, in fact, the same number of cables as the number of channels are provided. The interface unit 103 interfaces to a data processing apparatus located at a next stage or another communication network.

After data transferred from a data processing apparatus or another communication network are inputted to an interface unit 110 for each channel, the data are duplicated to the signals for the work and protection lines, and the signals for the work and protection lines are inputted to multiplexer units 109-1 and 109-2, respectively. The multiplexer units 109-1 and 109-2 multiplex signals for each channel. The signals outputted from the multiplexer units 109-1 and 109-2 are inputted to both of the optical transmitters 108-1 and 108-2. Overhead signals from an overhead byte multiplexer unit 107 are also inputted to the optical transmitters 108-1 and 108-2. Then, the overhead signals for the work and protection lines from the OHB multiplexer unit 107 are multiplexed in the optical transmitter units 108-1 and 108-2 with the data signals for the work and protection lines from the multiplexer units 109-1 and 109-2, the data signals for the work and protection lines and the overhead signals for the work and protection lines, respectively, are assembled into frames for the work and protection lines, furthermore the frames for a work line and the frames for a protection line are converted into optical signals for the work and protection lines, and the frames for the work and protection lines are transmitted to the work and protection lines, respectively, on the transmitting side. In the case of 1+1 MSP, signals transmitted to the work and protection lines have information with all the same contents.

Overhead signals demultiplexed by the optical receiver units 100-1 and 100-2 are further demultiplexed to individual overhead bytes by the overhead byte demultiplexer unit 104, and each overhead byte is transferred to an appropriate unit for the next processing. That is, after K bytes used for an APS are released from triple protection, the K bytes are transferred to the APS processing unit 105. The APS processing unit 105 executes a series of processes described later, and performs an automatic work/protection line bridging. The K bytes outputted from the overhead byte demultiplexer unit 104 are also inputted to a mismatching judgement unit 106. The mismatching judgement unit 106 monitors the K bytes. Then, when bridging is performed based on the mode of the own station, the mismatching judgement unit 106 detects the set value of a K byte which is not expected to be transmitted from the opposite station. If this value is detected, the mismatching judgement unit 106 reports to the APS processing unit 105 that there is a mode mismatching. The mismatching judgement unit 106 is described later. There are two kinds of modes for terminal stations; one is a uni/bi mode and the other is a rev/non-rev mode. For this reason, the mismatching judgement unit 106 also has a configuration for judging the uni/bi and rev/non-rev modes. When receiving the result of the mismatching judgement unit 106, the APS processing unit 105 generates a control signal for matching the modes of the own station and the opposite station, and inputs the control signal to the switching units 101-1 and 101-2. The switching units 101-1 and 101-2 input to the APS processing unit 105 a status signal indicating in which status the bridging is currently set. Thus, the APS processing unit 105 can check whether or not the APS units 101-1 and 101-2 are in a status designated by the control signal. Each overhead byte processed by the APS processing unit 105 and each overhead byte processing unit, not shown in the diagram, is multiplexed by an overhead byte multiplexer unit 107, is assembled into an overhead, and is inputted to the optical transmitter units 108-1 and 108-2.

Figure 11:
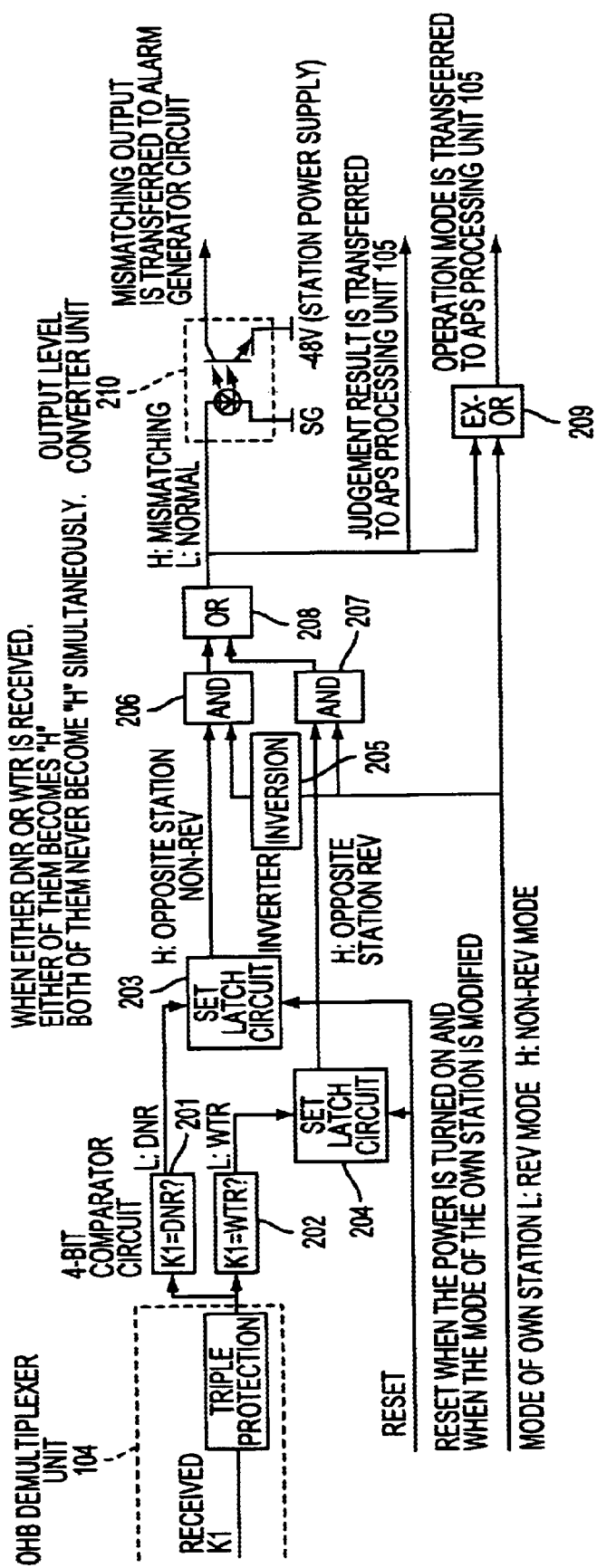
FIG. 11 is a block diagram of a circuit for judging the rev/non-rev mode of a mismatching judgement unit.

FIG. 11 is a block diagram of a circuit for judging the rev/non-rev mode of a mismatching judgement unit.

In order to execute a bridging process using data after being triple-protected by the OHB demultiplexer unit 104, the K bytes check using 4-bit comparator circuits 201 and 202 whether a received K1 byte after being triple-protected receives a DNR (Do Not Revert) or a WTR (Wait To Restore) signal. Then, the result is stored in latch circuits 203 and 204. When receiving a DNR and a WTR, this K1 signal indicates that the opposite station is in a non-rev mode and in a rev mode, respectively. Since in this case both DNR and WTR signals do not become "H" simultaneously, this DNR or WTR signal is compared with the mode in which the own station is currently set. The result of the comparison is indicated by the output of an OR circuit 208. The output becomes an "L" level and an "H" level when there is no mismatching and when there is a mismatching, respectively. This result is reported to the APS processing unit 105, and the judgement signal of which an output level converter unit 210, for example, consisting of a photo-coupler, etc. has converted the output level by a relay, etc. is also transmitted to an alarm generator circuit, not shown in the diagram. Furthermore, the MSP operation mode of the own station is inverted by an EX-OR circuit 209, the inverted mode is reported to the APS processing unit 105, and a work/protection line bridging sequence based on the K1 and K2 bytes is matched with a partner's mode. Thus, the mode mismatching of a rev/non-rev mode can be detected, and thereby the operation mode of the opposite station can be modified.

That is, after the K1 byte is triple-protected by the OHB demultiplexer unit 104, the K1 byte is inputted to 4-bit comparator circuits 201 and 202. If as a result of the comparison a matching cannot be obtained, these 4-bit comparator circuits 201 and 202 are configured so as to output a signal of an "H" level. The 4-bit comparator circuit 201 judges whether or not a DNR is set in the leading 4 bits of the K1 byte. If it is judged that a DNR is transmitted from the opposite station, it indicates that the opposite station is in a non-rev mode. On the other hand, the 4-bit comparator circuit 202 judges whether or not a WTR is set in the leading 4 bits of the K1 byte. If it is judged that a WTR is transmitted from the opposite station, it indicates that the opposite station is in a rev mode. If neither a DNR nor a WTR are set in the K1 byte, a signal of an "H" level is inputted from both 4-bit comparator circuits 201 and 202 to the latch circuits 203 and 204. Since the latch circuits 203 and 204 are reset both when the power of the own station is turned on and when a mode is modified, a signal of an "L" level is outputted from both 4-bit comparator circuits 201 and 202 to the latch circuits 203 and 204.

The latch circuits 203 and 204 shown in the diagram are configured so as to store latched signals when a signal of an "H" level is inputted to a SET terminal. Therefore, if neither a DNR nor a WTR are detected, a signal of an "H" level is inputted to the SET terminals of the latch circuits 203 and 204, and an "L" level is outputted from both latch circuits 203 and 204 when the latch circuits 203 and 204 are reset. The signals of an "L" level outputted from each of the latch circuits 203 and 204 are inputted to AND circuits 206 and 207, and a signal indicating the mode of the own station is also inputted. In the diagram the signal indicating the mode of the own station is configured so that "L" and "H" levels indicate rev and non-rev modes, respectively. This signal indicating the mode of the own station is inputted to the AND circuit 207 as it is, and the signal indicating the mode of the own station is inverted by an inverter 205 and inputted to the AND circuit 206.

When both outputs from the latch circuits 203 and 204 are at an "L" level, both the outputs of the AND circuits 206 and 207 become "L" levels. Therefore, the output of an OR circuit 208 at the next stage becomes an "L" level, and as a result of the judgement a "normal" signal is outputted. An output level converter unit 210 converts the levels of signals using a photo-coupler, etc., and transfers the result to an alarm generator circuit (not shown in the diagram). The result of the judgement is transferred to an APS processing unit 105, and is also inputted to the EX-OR circuit 209. Although a signal indicating the mode of the own station is inputted to the EX-OR circuit 209, the signal indicating the mode of the own station is also transferred to the APS processing unit 105 as a mode to be operated as it is, since the input from the OR circuit 208 is at an "L" level.

When either a DNR or a WTR is detected in the 4-bit comparator circuits 201 and 202, either of the outputs of the 4-bit comparator circuits 201 and 202 becomes a "L" level. Since the opposite station is in either a rev mode or a non-rev mode, both a DNR and a WTR are never detected simultaneously. When a signal of an "L" level is outputted from either of the 4-bit comparator circuits 201 and 202, either of the outputs of the latch circuits 203 and 204 becomes an "H" level.

The AND circuits 206 and 207 output a signal indicating the mode of the own station and an AND signal extracted from the latch circuits 203 or 204, respectively. If a WTR is detected when the own station in a rev mode, both the outputs from the AND circuits 206 and 207 become "L" levels. Therefore, the output of the OR circuit 208 is at an "L" level. If a DNR is detected when the own station is in a rev mode, the outputs of the AND circuits 206 and 207 become "H" and "L" levels, respectively. Accordingly, the output of the OR circuit 208 becomes an "H" level, and thereby a mode mismatching is detected. If a DNR is detected when the own station is in a non-rev mode, the outputs of the AND circuits 206 and 207 become "L" levels, and the output of the OR circuit 208 is at an "L" level. If a WTR is detected when the own station is in a non-rev mode, the output of the OR circuit 208 becomes an "H" level, since the outputs of the AND circuits 207 and 206 become "H" and "L" levels, respectively, and thereby a mode mismatching is detected.

Since a mode mismatching is indicated when the output of the OR circuit 208 is at an "H" level, the signal indicating the mode of the own station is inverted by the EX-OR circuit 209, and a signal indicating to which mode the mode of the own station should be modified is outputted to the APS processing unit 105. That is, when the own station is in the rev and non-rev modes, signals of non-rev and rev modes are transferred to the APS processing unit 105.

Although in the above description "H" and "L" levels are assigned to specific modes or signals, the "H" and "L" levels can be properly exchanged if the function of the circuit shown in the diagram is guaranteed.

FIG. 12 is a block diagram of a circuit for judging the uni/bi mode of a mismatching judgement unit.

Since an RR (Reverse-Request) is received by either the own station or the opposite station when the modes are mismatched, a 4-bit comparator circuit 301 for detecting an RR is provided to detect the RR on an uni-mode side and to modify the operation mode after a triple protection process, and the result of the detection is stored in the latch circuit 302. When the RR is received, that the opposite station is in a bi mode is set in the latch circuit 302. When the opposite station is in a bi mode, it is judged by logical operation between this result and the own station's mode whether or not the opposite station is mismatched with the own station.

This result is reported to the APS processing unit 105, and is also reported to the alarm generator circuit (not shown in the diagram) after the signal level is converted by an output level converter unit 305 consisting of a photo-coupler, etc. Furthermore, the MSP operation mode of the own station is inverted by an EX-OR circuit 306, the inverted MSP operation mode is reported to the ASP processing unit 105, and a bridging sequence based on the K1 and K2 bytes is matched with the mode of the opposite station. Thus, a uni/bi mode mismatching can be detected and thereby an operation mode can be modified.

That is, it can be judged in a 4-bit comparator circuit 301 whether or not an RR is set in the higher-order 4 bits of the K1 byte triple-protected by an overhead byte demultiplexer unit 104. When an RR is not detected, a signal of an "H" level is outputted from the 4-bit comparator circuit 301, and is inputted to the SET terminal of the latch circuit 302. The latch circuit 302 is reset both when the power of the own station is turned on and when the mode is modified, and outputs a signal of an "L" level. Since the output of the latch circuit 302 does not change when the input to the SET terminal is at an "H" level, a signal of an "L" level is outputted. The signal from the latch circuit 302 is inputted to an AND circuit 303. A signal indicating the mode of the own station is also inputted to the AND circuit. In the diagram "L" and "H" levels are assumed to indicate uni and bi modes, respectively. The logic of the signal indicating the mode of the own station is inverted by an inverter 304 and inputted to the AND circuit 303.

When a signal of an "L" level is inputted from the latch circuit 302 to the AND circuit 303, a signal of an "L" level is outputted from the AND circuit 303 when the own station is in both the uni and bi modes. Accordingly, as a result of the judgement, a "normal" signal is outputted. This signal is inputted to both the APS processing unit 105 and the EX-OR circuit 306. A signal indicating the mode of the own station is also inputted to the EX-OR circuit 306, and is transferred to the APS processing unit 105 as a mode to be operated by the own station. When a signal inputted from the AND circuit 303 to the EX-OR circuit 306 is at an "L" level, the signal indicating the mode of the own station is outputted from the EX-OR circuit 306 to the APS processing unit 105 as it is.

When an RR is detected in the 4-bit comparator circuit 301, the outputs of the 4-bit comparator circuit 301 and the latch circuit 302 become "L" and "H" levels, respectively. This indicates that the opposite station is in a bi mode. When the signal of an "H" level is inputted to the AND circuit 303 from the latch circuit 302, signals of "H" and "L" levels are outputted from the AND circuit 303 when the signal indicating the mode of the own station is at the "L" and "H" levels, respectively. Accordingly, when the mode of the own station is in a uni mode, a mode mismatching is detected. A signal indicating the mode mismatching is transferred to the APS processing unit 105, and is outputted to the alarm generator unit (not shown in the diagram) through an output level converter unit 305. This signal is also inputted to the EX-OR circuit 306, which inverts the signal indicating the mode of the own station, and then is transferred to the APS processing unit 105. That is, signals of "H" and "L" levels are outputted to the APS processing unit 105 when the mode of the own station is in the uni and bi modes, respectively.

In this circuit too, "H" and "L" levels can be properly exchanged if the function of this circuit is guaranteed, in the same way as described in FIG. 11.

FIG. 13 is a circuit block diagram of a mismatching judgement unit with the judgement configuration of both rev/non-rev and uni/bi modes.

Since the operation of a rev/non-rev mismatching judgement block 402 in the diagram is the same as the operation of a part comprising the latch circuits 203 and 204, inverter 205, AND circuits 206 and 207 and OR circuit 208 shown in FIG. 11, the detailed description of the rev/non-rev mismatching judgement block 402 is omitted. Since the operation of a uni/bi mismatching judgement block 403 is the same as the operation of a part comprising the latch circuit 302, inverter 304 and AND circuit 303 shown in FIG. 12, the detailed description of the uni/bi mismatching judgement block 403 is also omitted.

It is reported to the APS processing unit 105 whether or not the K1 and K2 bytes triple-protected by an overhead byte (OHB) demultiplexer unit 104 have contents which are different from the K1 and K2 bytes so far transferred. The APS processing unit 105 detects the changes of the K1 and K2 bytes, and starts processes corresponding these changes.

It is judged by 4-bit comparator circuits 401-1, 401-2 and 401-3 whether or not a DNR, WTR or RR, respectively, is set in the higher-order 4 bits of the K1 byte transferred from the OHB demultiplexer unit 104. When the comparison results of the 4-bit comparator circuits 401-1, 401-2 and 401-3 are negative, the outputs become "H" levels. Meanwhile, when any of DNR, WTR and RR is detected, the output of the respective 4-bit comparator circuit becomes an "L" level. The outputs of the 4-bit comparator circuits 401-1 and 401-2 are inputted to the rev/non-rev mismatching judgement block 402, and the output of the 4-bit comparator circuit 401-3 is inputted to the uni/bi mismatching judgement block 403.

The operation of the rev/non-rev mismatching judgement block 402 is as described with reference to FIG. 11. That is, if the rev/non-rev mode of the opposite station coincides with the rev/non-rev mode of the own station when the rev/non-rev modes of the opposite station and the own station are compared, a signal of an "L" level is outputted. If the rev/non-rev mode of the opposite station is mismatched with the rev/non-rev mode of the own station when the rev/non-rev modes of the opposite station and the own station are compared, a signal of an "H" level is outputted. This output is transferred to the APS processing unit 105, and is also transferred to the alarm generator unit (not shown in the diagram) through the output level converter unit 406. This output is further inputted to the EX-OR circuit 404, which transfers a signal indicating the rev/non-rev mode of the own station to the APS processing unit 105 as it is or after inverting the signal depending on the result of the mismatching judgement.

The operation of the uni/bi mismatching judgement block 403 is as described with reference to FIG. 12. That is, if the uni/bi mode of the opposite station coincides with the uni/bi mode of the own station when the uni/bi modes of the opposite station and the own station are compared, a signal of an "L" level is outputted. If the uni/bi mode of the opposite station is mismatched with the uni/bi mode of the own station when the uni/bi modes of the opposite station and the own station are compared, a signal of an "H" level is outputted. This output is transferred to the APS processing unit 105, and is also transferred to the alarm generator unit (not shown in the diagram) through the output level converter unit 407. This output is further inputted to the EX-OR circuit 405, which transfers the signal indicating the rev/non-rev mode of the own station to the APS processing unit 105 as it is or after inverting the signal depending on the result of the mismatching judgement.

Although in FIGS. 11 and 12 a configuration in which changes of K bytes are reported to the APS processing unit 105 in a block for triple-protecting the K bytes is not shown, this is because only the configuration for detecting a mode mismatching is described. An actual apparatus is provided with a configuration for detecting the changes of the K bytes in order to start operation of the APS processing unit 105.

Although in FIGS. 11 through 13 a function of judging a mismatching is described to be composed using hardware, this function can also be implemented using software. In this case, the logic of the circuits described in these diagrams are to be implemented using software.

Figure 14:
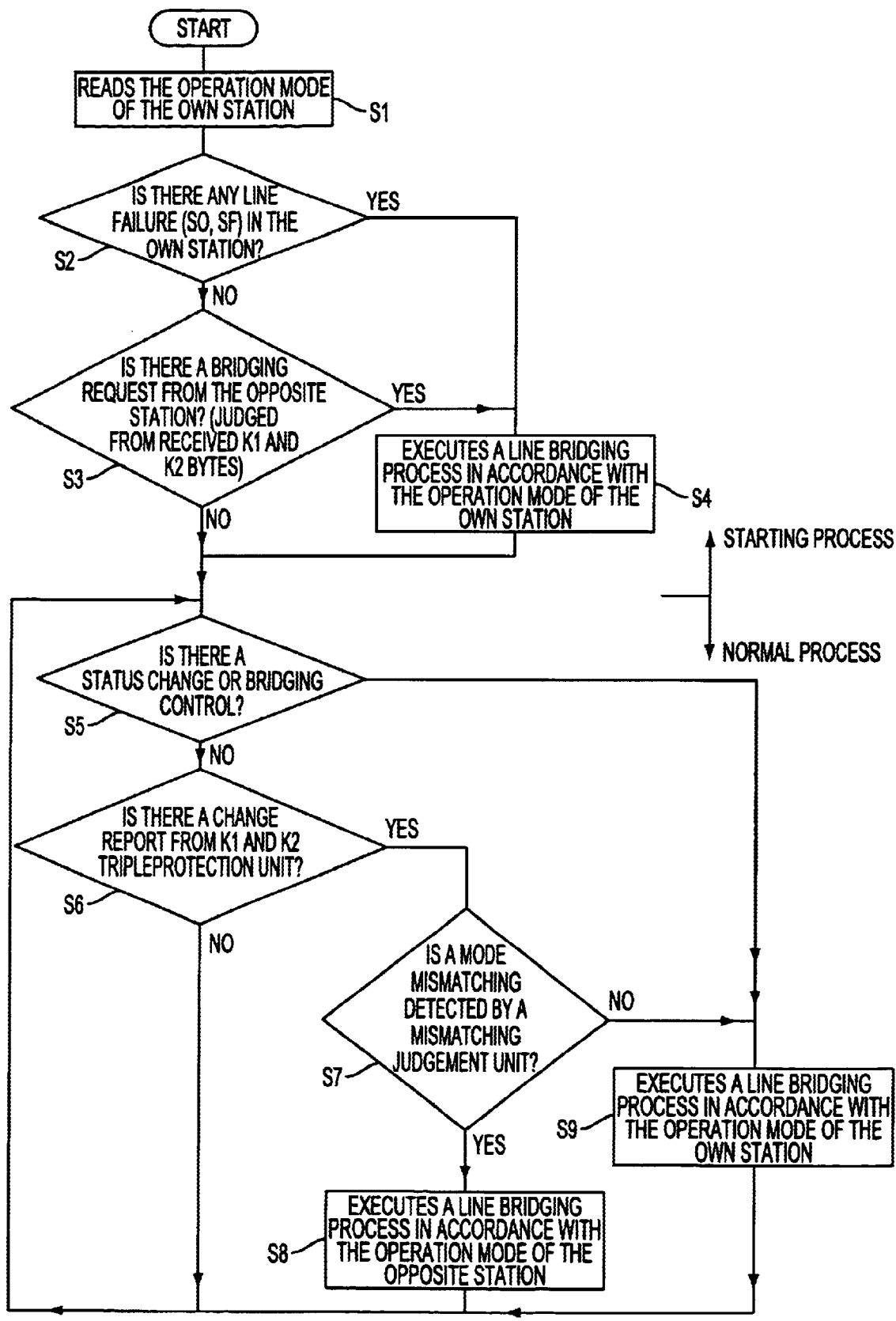
FIG. 14 is a flowchart showing a process executed by an APS processing unit.

FIG. 14 is a flowchart showing a process executed by an APS processing unit.

Steps S1 through S4 are processes executed when operation of the APS processing unit 105 of the own station is started. Steps S5 through S9 are processes executed when usually communicating with the opposite station.

When operation of the APS processing unit 105 of the own station is started, in step S1 the processor of the APS processing unit reads the operation modes (uni/bi and rev/non-rev modes) to be followed by the own station which are stored in the memory of the APS processing unit 105. Then, it is determined whether or not there is any line failure (SF: Signal Failure or SD: Signal Degrade) in an apparatus for monitoring the received signals in the own station (Step 2).

If it is judged that there is a line failure, the flow proceeds to step S4. If not, in step S3 it is judged from the received K1 and K2 bytes whether or not there is a request for bridging the work/protection lines of the opposite station. If there is a request for bridging the lines the flow proceeds to step S4. In step S4 the lines of the opposite station are bridged in accordance with the operation mode of the own station, and the flow proceeds to step S5. When in step S3 there is no request for bridging the lines from the opposite station, the flow proceeds to step S5.

In step S5 it is judged whether or not an apparatus for monitoring the received signals in the own station detects the change in status of the line failure or the apparatus is controlling the bridging of the work/protection lines. In step S5, if it is judged that there is a change in the status of the line failure or the apparatus should control the bridging, in step S9 the lines of the opposite station are bridged in accordance with the operation modes of the own station, and then the process returns to step S5.

In step S5, if it is judged that there is no change in the status of a line failure or there is no need for the apparatus to control the bridging, the flow proceeds to step S6. In step S6 it is judged whether or not a change in the K bytes is reported from a triple protection unit of the K1 and K2 bytes to the APS processing unit 105. If it is judged that the status changes are not reported, the flow returns to step S5. In step S6, if it is judged that a change is reported, the flow proceeds to step S7. In step S7 it is judged whether or not a mode mismatching is detected in a mismatching judgement unit 106.

If in step S7 it is judged that the mode mismatching is not detected, in step S9 the lines of the opposite station are bridged in accordance with the operation mode of the own station, and the flow returns to step S5. If in step S7 it is judged that the mode mismatching is detected, in step S8 the lines of the own station are bridged in accordance with the operation of the opposite station, and the flow returns to step S5.

In a normal operation, subsequently, a line bridging process due to the occurrence of a failure is implemented by repeating steps S5 through S9.

As described above, when work and protection lines are automatically bridged, abnormal operations can be suppressed as much as possible at the time of an actual bridging process, and it can be reported to the supervisor that the operation modes of the own and opposite stations are mismatched, even if the operation mode of the opposite station is not reported to the own station by a control signal exchanged between the terminal stations. Alternatively, the operation modes of the own and opposite stations can be automatically matched.

What is claimed is:

1. A terminal station in a synchronous communication network where data are exchanged in units of frames including an overhead for storing a control signal, comprising:
    extracting means for extracting from a received overhead information indicating request contents needed to execute a process of automatically bridging a working line and a protection line;
    mismatching judging means for judging mismatching between the work/protection line bridging mode of a terminal station transmitting the information and the work/protection line bridging mode of the own terminal station by judging whether or not the request contents of the information are used in the work/protection line bridging mode of the own station;
    automatic bridging means for matching the work/protection line bridging mode of the terminal station transmitting the information with the work/protection line bridging mode of the own terminal station based on the judgment result of the mismatching judging means;
    wherein said synchronous communication network is a SONET or SDH network;
    wherein said information are K bytes in a SONET or SDH network; and
    wherein said mismatching judging means judges mismatching between revertive/non-revertive modes.

2. The terminal station in a synchronous communication network according to claim 1, wherein
    said mismatching judging means judges mismatching by detecting a DNR or a WTR set in said K bytes.

3. A terminal station in a synchronous communication network where data are exchanged in units of frames including an overhead for storing a control signal, comprising:
    extracting means for extracting from a received overhead information indicating request contents needed to execute a process of automatically bridging a working line and a protection line;
    mismatching judging means for judging mismatching between the work/protection line bridging mode of a terminal station transmitting the information and the work/protection line bridging mode of the own terminal station by judging whether or not the request contents of the information are used in the work/protection line bridging mode of the own station;
    automatic bridging means for matching the work/protection line bridging mode of the terminal station transmitting the information with the work/protection line bridging mode of the own terminal station based on the judgement result of the mismatching judging means;
    wherein said synchronous communication network is a SONET or SDH network;
    wherein said information are K bytes in a SONET or SDH network; and
    wherein said mismatching judging means judges mismatching between uni-directional/bi-directional modes.

4. The terminal station in a synchronous communication network according to claim 3, wherein
    said mismatching judging means judges mismatching by detecting an RR set in said K bytes.

5. An apparatus for detecting mismatching of inter-station operation modes relating to an automatic work/protection line bridging process provided in terminal stations of a SONET or SDH communication network, comprising:
    comparing means for judging whether or not a predetermined request relating to the work/protection line bridging is set in K bytes extracted from a signal which is received by the own terminal station;
    mode judging means for comparing the operation mode of a terminal station transmitting the signal which is obtained as the judgment result of the comparing means with the operation mode of the own terminal station, judging whether or not both operation modes are matched and outputting the judgment result;
    wherein said predetermined request is a DNR or a WTR set in the K bytes.

6. An apparatus for detecting mismatching of inter-station operation modes relating to an automatic work/protection line bridging process provided in terminal stations of a SONET or SDH communication network, comprising:

comparing means for judging whether or not a predetermined request relating to the work/protection line bridging is set in K bytes extracted from a signal which is received by the own terminal station;

mode judging means for comparing the operation mode of a terminal station transmitting the signal which is obtained as the judgment result of the comparing means with the operation mode of the own terminal station, judging whether or not both operation modes are matched and outputting the judgment result;

wherein said predetermined request is an RR set in the K bytes.

7. A method for judging operation mode mismatching between terminal stations in a synchronous communication network where data are exchanged in units of frames including an overhead for storing a control signal, comprising the steps of:

(a) extracting information indicating request contents needed to execute a process for automatically bridging a work line and a protection line from a received overhead;

(b) judging mismatching between the work/protection line bridging operation mode of a terminal station transmitting the information and the work/protection line bridging operation mode of the own terminal station by judging whether or not the request contents of the information are used in the work/protection line bridging operation mode of the own terminal station;

(c) matching the work/protection line bridging operation mode of the terminal station transmitting the information with the work/protecting line bridging operation mode of the own terminal station based on the judgment result of step (b);

wherein said synchronous communication network is a SONET or SDH network;

wherein said information are K bytes in a SONET or SDH network;

wherein said step (b) of judging mismatching judges mismatching between revertive/non-revertive modes.

8. The method for judging operation mode mismatching between terminal stations in a synchronous communication network according to claim 7, wherein said step (b) of judging mismatching judges mismatching by detecting a DNR or a WTR set in said K bytes.

9. A method for judging operation mode mismatching between terminal stations in a synchronous communication network where data are exchanged in units of frames including an overhead for storing a control signal, comprising the steps of:

(a) extracting information indicating request contents needed to execute a process for automatically bridging a work line and a protection line from a received overhead;

(b) judging mismatching between the work/protection line bridging operation mode of a terminal station transmitting the information and the work/protection line bridging operation mode of the own terminal station by judging whether or not the request contents of the information are used in the work/protection line bridging operation mode of the own terminal station;

(c) matching the work/protection line bridging operation mode of the terminal station transmitting the information with the work/protecting line bridging operation mode of the own terminal station based on the judgment result of step (b);

wherein said synchronous communication network is a SONET or SDH network;

wherein said information are K bytes in a SONET or SDH network;

wherein said step (b) of judging mismatching judges mismatching between uni-directional/bi-directional modes.

10. The method for judging operation mode mismatching between terminal stations in a synchronous communication network according to claim 9, wherein said step (b) of judging mismatching judges mismatching by detecting an RR set in said K bytes.

11. A method for detecting mismatching of inter-station operation modes relating to an automatic work/protection line bridging process provided in terminal stations of a SONET or SDH communication terminal network, comprising the steps of:

(a) judging whether or not a predetermined request relating to a work/protection line bridging process is set in K bytes extracted from a signal which is received by the own terminal station and (b) comparing the operation mode of a terminal station transmitting the signal which is obtained from the judgment result of the step (a) with the operation mode of the own terminal station, judging whether or not both operation modes are matched and outputting the judgment result;

wherein when said predetermined request is a DNR, it is judged that the operation mode of a terminal station transmitting said signal is in a non-revertive mode, and when said predetermined request is a WTR, it is judged that the operation mode of the terminal station transmitting said signal is in a revertive mode.

12. A method for detesting mismatching of inter-station operation modes relating to an automatic work/protection line bridging process provided in terminal stations of a SONET or SDH communication terminal network, comprising the steps of:

(a) judging whether or not a predetermined request relating to a work/protection line bridging process is set in K bytes extracted from a signal which is received by the own terminal station and (b) comparing the operation mode of a terminal station transmitting the signal which is obtained from the judgment result of the step (a) with the operation mode of the own terminal station, judging whether or not bosh operation modes are matched and outputting the judgment result;

when said predetermined request is an RR, it is judged that the operation mode of a terminal station transmitting said signal is in a bi-directional mode.

* * * * *